United States Patent [19]

Hoffman

[11] Patent Number: 4,828,018
[45] Date of Patent: May 9, 1989

[54] MOTOR VEHICLE AIR CONDITIONING AND HEATING SYSTEM WITH BI-LEVEL MODE

[75] Inventor: Donald E. Hoffman, Java Center, N.Y.

[73] Assignee: General Motors Corporation, Detroit, Mich.

[21] Appl. No.: 112,371

[22] Filed: Oct. 26, 1987

Related U.S. Application Data

[63] Continuation-in-part of Ser. No. 56,045, Jun. 1, 1987, abandoned.

[51] Int. Cl.$^4$ .................. B60H 3/00; B61D 27/00
[52] U.S. Cl. .......................... 165/42; 165/43; 237/12.3 B; 236/13; 98/2.08
[58] Field of Search ............ 165/16, 41, 42, 43; 237/12.3 B, 2 A; 236/13; 98/208, 201

[56] References Cited

U.S. PATENT DOCUMENTS

| | | | |
|---|---|---|---|
| 3,421,576 | 1/1969 | Roane | 237/12.3 B |
| 3,656,541 | 4/1972 | Coyle et al. | 165/16 |
| 4,108,376 | 8/1978 | Matsuda et al. | 237/12.3 B |
| 4,143,706 | 3/1979 | Schnaibel et al. | 165/26 |
| 4,289,195 | 9/1981 | Bellot et al. | 165/42 |
| 4,340,112 | 7/1982 | Sutoh et al. | 165/16 |
| 4,356,965 | 11/1982 | Matsushima et al. | 237/12.3 B |
| 4,368,843 | 1/1983 | Kai et al. | 165/16 |
| 4,383,642 | 5/1983 | Sumikawa et al. | 237/12.3 A |
| 4,440,212 | 4/1984 | Tanino et al. | 165/12 |
| 4,513,808 | 4/1985 | Ito et al. | 165/43 |
| 4,515,208 | 5/1985 | Sakurai et al. | 165/43 |
| 4,566,531 | 1/1986 | Stolz | 165/42 |
| 4,574,873 | 3/1986 | Kawahira et al. | 165/42 |
| 4,577,800 | 3/1986 | Yuchi | 165/41 |
| 4,653,689 | 3/1987 | Sakurai et al. | 165/42 |
| 4,681,153 | 7/1987 | Uchida | 236/13 |
| 4,697,734 | 10/1987 | Ueda | 236/13 |
| 4,709,751 | 12/1987 | Ichimaru et al. | 165/16 |

FOREIGN PATENT DOCUMENTS

| | | | |
|---|---|---|---|
| 0068413 | 5/1980 | Japan | 237/12.3 B |
| 0001016 | 1/1985 | Japan | 165/16 |
| 0012329 | 1/1985 | Japan | 165/16 |

*Primary Examiner*—Albert W. Davis, Jr.
*Assistant Examiner*—John K. Ford
*Attorney, Agent, or Firm*—R. L. Phillips

[57] ABSTRACT

A motor vehicle air conditioning and heating system having an evaporator and a valve controlled heater core is provided with a cold air bypass around the heater core and upper and lower compartment outlets which outlets and bypass are controlled by a single mode valve to provide a bi-level mode. In one embodiment, the mode valve comprises a singular valve element. In another embodiment, the mode valve comprises two valve elements which are linked together.

2 Claims, 2 Drawing Sheets

MOTOR VEHICLE AIR CONDITIONING AND HEATING SYSTEM WITH BI-LEVEL MODE

This is a continuation-in-part of U.S. application Ser. No. 056,045, filed June 1, 1987 and now abandoned.

TECHNICAL FIELD

This invention relates to motor vehicle air conditioning and heating systems and more particularly to those where the hot liquid flow from the engine through the heater core is controlled to control air delivery temperature to the passenger compartment.

BACKGROUND OF THE INVENTION

In those motor vehicle air conditioning and heating systems where the hot liquid flow from the engine's coolant system through the heater core is controlled to control the temperature of the air delivered to the passenger compartment, conventional practice has been to pass all the air through both the evaporator and heater core with the tempered air then distributed to the head and foot regions of the passenger compartment at the same temperature. As a result, there is no so-called bi-level air distribution within the passenger compartment in the air conditioning mode. Such bi-level air distribution is desirable since for example on a winter day with a high sun load via the windows, it may be more comfortable to the passengers to have the air delivered to the foot or floor region warmer than that delivered to the head region. And likewise on a summer day it may be more comfortable to have the air delivered at head level cooler than that delivered at foot level.

SUMMARY OF THE INVENTION

The present invention provides such a bi-level mode in a very cost effective manner in a motor vehicle air conditioning and heating system where the engine coolant circulated through the heater core is controlled by a valve to control air temperature in the passenger compartment. This is simply accomplished with the addition of a bypass duct for bypassing air from the evaporator around the heater core and a mode valve arrangement which controls the opening and closing of the bypass duct and also an upper and lower discharge outlet from the tempered air chamber downstream of the heater core. In the heater mode, the mode valve operates to close both the bypass duct and the upper outlet so that all air then flows through the heater core to the tempered air chamber and out the lower outlet to the foot region. In the air conditioning mode, the mode valve operates to close the lower outlet and open both the bypass duct and the tempered air chamber to the upper outlet to deliver to the head region a mixture of evaporator outlet air and evaporator outlet air tempered by the heater core. And because of the bypass, it is possible to reduce the heater core size since not all air is flowing through the heater core which is an air flow restriction in this type of system. In the bi-level mode, the mode valve operates to open both the bypass and the tempered air chamber to both the upper and lower outlet but with the mode valve arranged such that the bypass duct is essentially directly open to the upper outlet so that colder air is delivered to this outlet than to the lower outlet. Moreover, the mode valve is adjustable in the bi-level mode to adjust the influence of the bypass flow to vary the temperature differential between the head and foot area to arrive at the most comfortable temperature distribution range for the individual.

With the above in mind, it is thus an object of the present invention to provide a bi-level mode in a motor vehicle air conditioning and heating system employing a valve controlled heater core.

Another object is to provide in a motor vehicle air conditioning and heating system having a valve controlled heater core, a bypass duct bypassing air from the evaporator around the heater core and a mode valve operable to control the opening of the bypass duct to a tempered air chamber downstream of the heater core as well as head and foot region outlets from this chamber.

Another object is to provide in a motor vehicle air conditioning and heating system having a valve controlled heater core, a bypass duct for bypassing air from the evaporator around the heater core and a mode valve operable in a bi-level mode to connect the bypass duct and a tempered air chamber downstream of the heater core to a head region outlet while also opening the tempered air chamber to a foot region outlet.

These and other objects, advantages and features of the present invention will become more apparent from the following description and accompanying drawing in which:

DESCRIPTION OF PREFERRED EMBODIMENT

Figure 1:
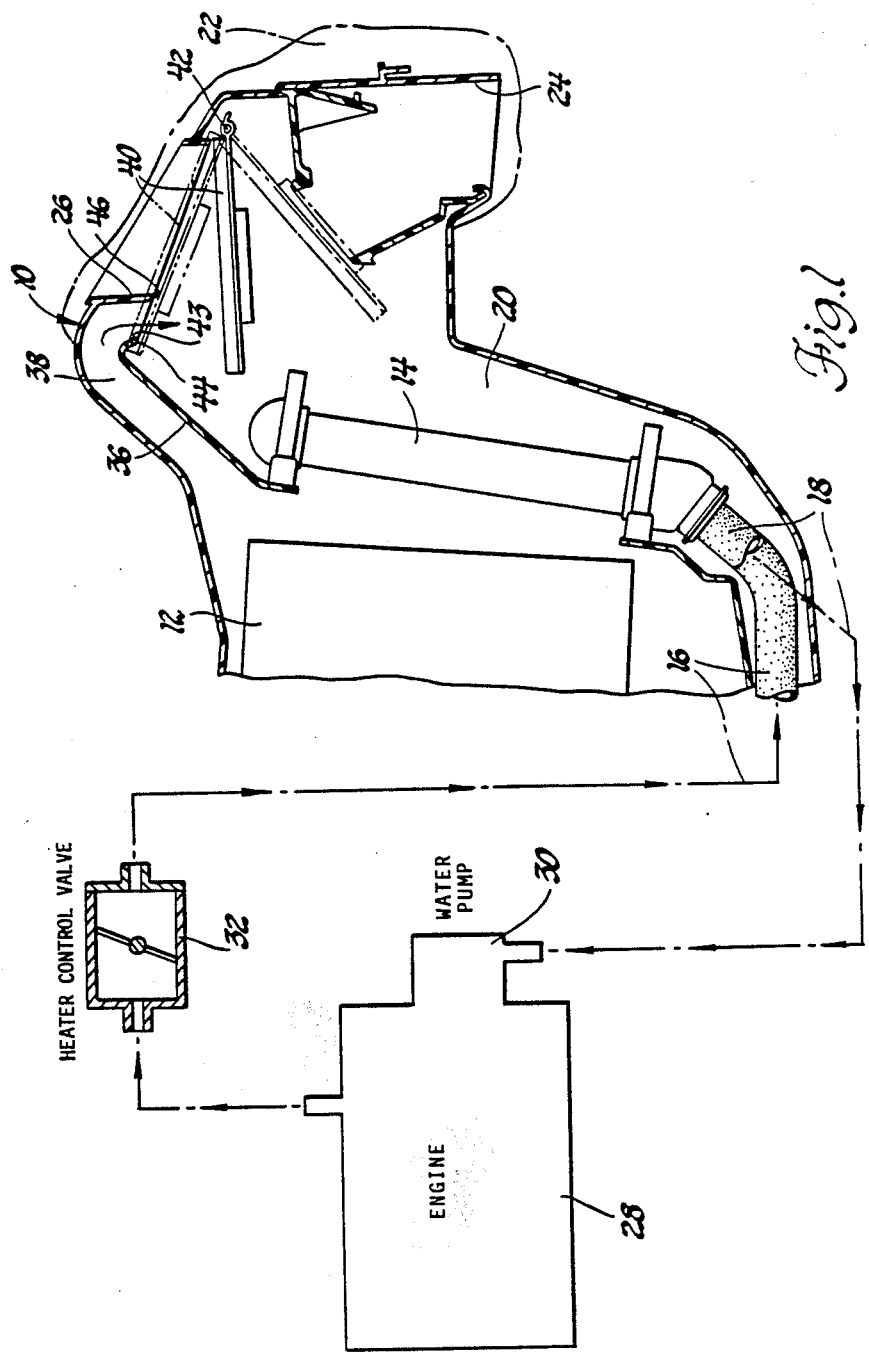

FIG. 1 schematically shows a motor vehicle air conditioning and heating system according to the present invention and wherein the principal arrangement is shown in side sectional view.

Figure 2:
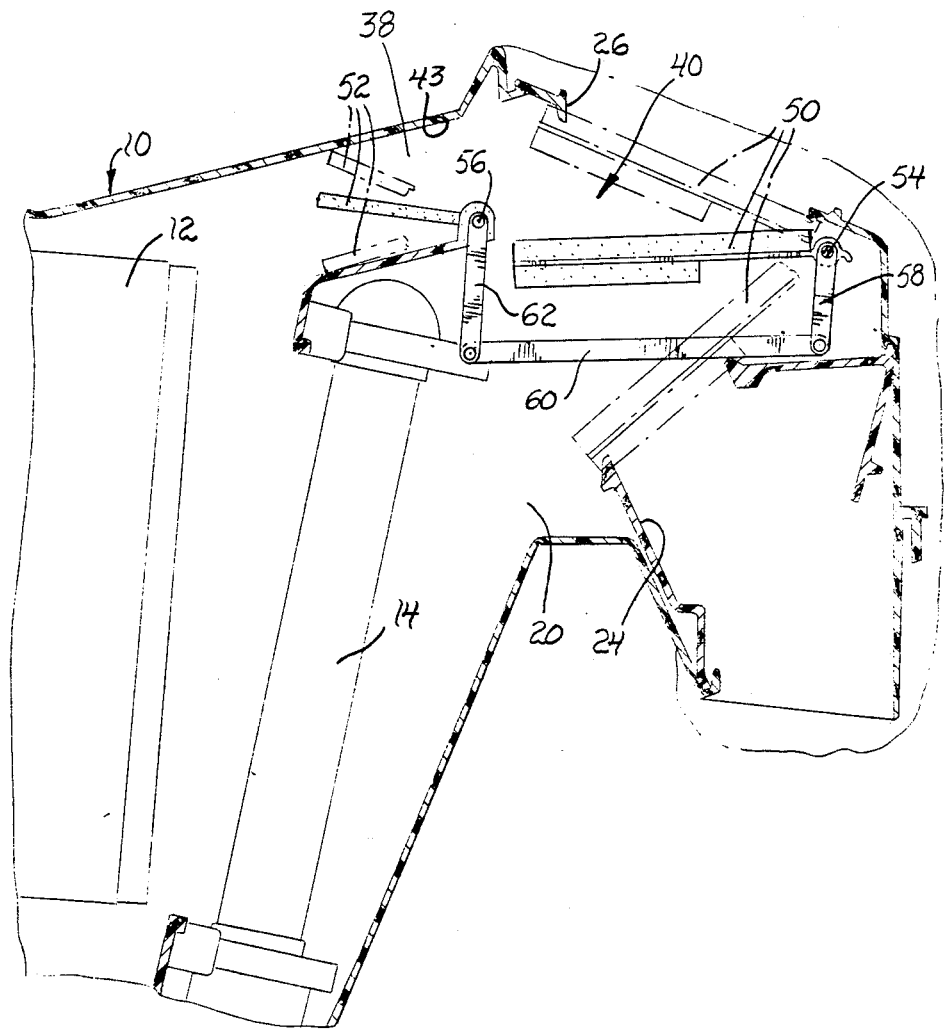

FIG. 2 is a view similar to the side sectional view in FIG. 1 but of another embodiment of the mode valve according to the present invention.

Referring to FIG. 1, a casing 10 of a motor vehicle air conditioning and heating system has contained therein an evaporator 12 and a heater core 14 that is located opposite the downstream face of the evaporator and connected with the vehicle's engine coolant system by a delivery line 16 and return line 18. A blower (not shown) blows outside air through the evaporator and thence through the heater core into a tempered air chamber 20 which is openable to the motor vehicle's passenger compartment space 22 through both a lower outlet 24 and an upper outlet 26 which are arranged to direct the air toward the foot region and head region, respectively, of the passenger compartment. The amount of heat available from the heater core 14 is controlled by controlling the amount of engine coolant circulated therethrough from the coolant system of the vehicle's engine 28 with its water pump 30. Such control is provided by a heater control valve 32 in the delivery line to the heater core. The system as thus far described is of conventional design and with operation of the valve 32 would normally deliver tempered air to both the upper and lower outlets at the same temperature.

However, the casing 10 has an added interior wall 36 formed therein that extends from the upper rear side of the heater core to a location adjacent the upper outlet 26 so as to form a bypass passage 38 that extends over the top of the heater core so as to direct the cold air from the evaporator 12 around the heater core and downwardly in the direction indicated by the arrow into the tempered air chamber 20 adjacent the upper outlet. A mode valve 40 is pivotally mounted by a pin 42 in the casing between the two casing outlets 24 and 26 so as to be movable between the two extreme positions shown in phantom line to close either the lower outlet 24 or both the upper outlet 26 and the outlet 43 of the bypass duct whose valve seat 44 is made co-planar with that 46 of the upper outlet for that purpose. The function of the mode valve 40 which is pivoted external of the casing by conventional means (not shown) is to select whether air is directed through the upper outlet only with the bypass open, the lower outlet only or out both the upper and lower outlets with the bypass open.

In the heater mode, the mode valve is positioned in the extreme upward position shown in phantom line where it operates to close both the bypass duct 38 at its outlet 43 as well as the upper outlet 26. As a result, the cold air bypass is sealed and all air flows through the heater core into the tempered air chamber 20 and out through the lower outlet 24 to the floor space. In the air conditioning mode, the mode valve is moved to its other extreme position which is the lower position where it closes the lower outlet 24 and simultaneously opens both the bypass outlet 43 and the upper outlet 26. As a result, all air out of the evaporator flows through both the bypass duct 38 and the heater core and out the upper outlet to the head space. And since not all the air is passing through the heater core which is an air flow restriction in this type of system it is thus possible to reduce its core size.

In the bi-level mode, the mode valve is moved to a midposition as shown in solid line where it operates to (a) simultaneously open the bypass duct 38 and both the lower outlet 24 and upper outlet 26 and (b) also baffle the cold bypass air from the remotely located lower outlet 24 and direct same toward the upper outlet 26. As a result, a fixed amount of cold untempered air at this midposition of the mode valve is allowed to mix with air from the chamber 20 tempered by the heater core thus providing a colder air out the upper outlet than the air that is flowing out the lower outlet. And the amount of cold untempered air and thus the bi-level air temperature variance between the head and foot spaces is adjusted by varying the midposition of the mode valve between its two extremes with more cold untempered air being delivered to the upper outlet and thus a greater variance obtained by pivoting the mode valve upward and the reverse occurring on opposite or downward movement. And it will also be appreciated that in all three modes, the heater control valve 32 may be adjusted to regulate the hot coolant flow through the heater core and thereby the amount of heat given up to the air that is delivered to the tempered air chamber 20.

Referring to FIG. 2 wherein parts similar to those in FIG. 1 are identified by the same numerals and additional parts by new numerals, there is shown a two-element embodiment of the mode valve 40 that is operable to provide a controlled amount of air conditioned (cold) air to enter the tempered chamber 20. In this embodiment, the mode valve 40 comprises an outlet valve element 50 that is operable to control the lower outlet 24 and upper outlet 26 of the casing 10 and a separate bypass valve 52 that is operable to control only the bypass duct outlet 43 leading to the tempered chamber. The valve elements 50 and 52 are pivotally mounted by parallel pins 54 and 56 respectively in the casing and are connected for conjoint movement by slave linkage 58, 60 and 62 under manual control of the one element 50 which thus will also be referred to as the mode control valve element.

In the FIG. 2 arrangement and with the mode control valve element 50 in the mid or bi-level position shown in solid line, the bypass valve element 52 is positioned by the slave linkage in a corresponding midposition also shown in solid line where it partially opens the bypass duct (such positions being shown in phantom line). Alternatively, on extreme upward movement of the mode control valve element 50 to the heater mode position where this valve element then closes the upper outlet 26, the slave linkage then positions the bypass valve element 52 to close the bypass duct 38. On the other hand, on extreme downward movement of the mode control valve element 50 to the air conditioning mode position where this valve element then closes the lower outlet 24, the slave linkage then positions the bypass valve element 52 to fully open the bypass duct 38 (such positions also being shown in phantom line).

In the FIG. 2 embodiment, the air volumes and distribution are predetermined as follows. For the air conditioning mode, the bypass duct 38 is sized so that when the mode valve is in its full air conditioning position with heater control valve off and cold air flowing through the heater core, the combination of these two flow area provides the required amount of air conditioned air with the minimum heater core size.

In the bi-level mode, with the heater valve open, the bypass duct flow area is reduced with the midpositioning of the mode valve elements to provide the required amount of cold air to mix with the air flowing through the evaporator and heater core exiting through the upper air conditioning outlet 26. The balance of the air flowing through the evaporator and heater core exits though the lower heater outlet 24. The net result is cooler air out the air conditioning outlet and warmer air out the heater outlet in the bi-level mode with a smaller heater core as compared with that in the FIG. 1 embodiment.

The above described preferred embodiments are illustrative of the invention which may be modified within the scope of the appended claims.

The embodiments of the invention in which an exclusive property of privilege is claimed are defined as follows:

1. An air conditioning and heating system for a motor vehicle passenger compartment comprising a casing containing an evaporator and a heater core for receiving air passing from the evaporator, means for controlling heated liquid flow from an engine coolant system through the heater core to control the heat given up thereby, a tempered air chamber in said casing for receiving air passing from the heater core, an upper outlet in said casing for opening said chamber to an upper region of the passenger compartment, a lower outlet in said casing for opening said chamber to a lower region of the passenger compartment, said duct arrangement further including a bypass duct for bypassing air from the evaporator around the heater core to said chamber at a location adjacent said upper outlet, said bypass duct and said upper outlet having co-planar valve seats internal of said casing, and air valve means pivotally mounted in said casing between said outlets for pivotal movement to one position contacting said co-planar valve seats to close both said bypass duct and said upper outlet, said air valve means being further pivotable to another position closing said lower outlet, said air valve means being further pivotable to a midposition opening both said outlets and said bypass duct while forming a barrier between said bypass duct and said lower outlet.

2. An air conditioning and heating system for a motor vehicle passenger compartment comprising a casing containing an evaporator and a heater core for receiving air passing from the evaporator means for controlling heated liquid flow from an engine coolant system through the heater core to control the heat given up thereby, a tempered air chamber in said casing for receiving air passing from the heater core, an upper outlet in said casing for opening said chamber to an upper region of the passenger compartment, a lower outlet in said casing for opening said chamber to a lower region of the passenger compartment, said duct arrangement further including a bypass duct for bypassing air from the evaporator around the heater core to said chamber at a location adjacent said upper outlet, said bypass duct and said upper outlet having co-planar valve seats internal of said casing, and air valve means movably mounted in said casing between said outlets for movable movement to one position contacting said co-planar valve seats to close both said bypass duct and said upper outlet, said air valve means being further movable to another position closing said lower outlet, said air valve means being further movable to a midposition opening both said outlets and said bypass duct while forming a barrier between said bypass duct and said lower outlet.

* * * * *